United States Patent [19]

Sakata et al.

[11] 4,389,783
[45] Jun. 28, 1983

[54] MEASURING DEVICE

[75] Inventors: Hideo Sakata; Seigo Takahashi, both of Kawasaki, Japan

[73] Assignee: Kabushiki Kaisha Mitutoya Seisakusho, Tokyo, Japan

[21] Appl. No.: 212,133

[22] Filed: Dec. 2, 1980

[30] Foreign Application Priority Data

Dec. 5, 1979 [JP] Japan ................................ 54-157577

[51] Int. Cl.³ .............................................. G01B 5/02
[52] U.S. Cl. ................................ 33/143 K; 33/143 L; 33/143 J
[58] Field of Search ............. 33/143 R, 143 J, 143 K, 33/143 M, 147 R, 147 J, 147 K, 147 N

[56] References Cited

U.S. PATENT DOCUMENTS

| 2,581,264 | 1/1952 | Levesque | 33/147 N |
| 2,741,848 | 4/1956 | Livingston 33 | 143 K X/ |
| 3,113,384 | 12/1963 | Keszler | 33/143 K |
| 3,483,626 | 12/1969 | Huttel | 33/143 L |
| 4,188,727 | 2/1980 | Matui | 33/147 J X |

Primary Examiner—Harry N. Haroian
Attorney, Agent, or Firm—Quaintance & Murphy

[57] ABSTRACT

Herein disclosed is a measuring device such as a micrometer, slide calipers, a depth gauge or a height gauge, in which a slider is so provided that it can move back and forth in the same direction of such a relatively movable portion as can move relative to a frame and that it can be fixed on said frame at any position in the forward and backward moving directions thereof, and in which there is interposed between said slider and said relatively movable portion such spring bias means as can apply its spring force to said relatively movable portion in the forward and backward moving directions of the same, whereby the measuring pressure to be applied to a test piece by said relatively movable portion can be automatically predetermined at a substantially constant level independently of the position of said relatively movable portion relative to said frame.

5 Claims, 2 Drawing Figures

MEASURING DEVICE

BACKGROUND OF THE INVENTION

The present invention relates to a measuring device such as a micrometer, slide calipers, a depth gauge or a height gauge and contemplates to automatically establish a constant measuring pressure independently of the intention of a measurer.

A measuring device such as a micrometer, slide calipers, a depth gauge or a height gauge is used to measure the length of a test piece (an object to be measured) by having its movable portion contacting with the test piece. The measurement of the length of a test piece by the measuring device of that type is performed by manually moving the movable portion until its portion contacts with the test piece and by clamping the test piece together with a stationary portion.

As a result, the measuring device has an advantage that the operation can be performed easily and promptly. However, since the test piece has to be held by the force of the fingers of the measurer, the indicated values have a tendency to become different in accordance with the changeable measurers and with the shapes of the test pieces so that the measurements cannot be always performed accurately.

In view of this tendency, there has been conceived a device, in which a spring is interposed between the movable portion and a lift knob where the finger of the measurer is applied to move the movable portion so that the measuring pressure for holding the test piece may be made constant by the elastic force of the spring. The device of this type also has a tendency that the spring is warped, when the lift knob is pushed by a stronger force than a usual one, thereby to invite similar results to the aforementioned ones.

SUMMARY OF THE INVENTION

It is therefore an object of the present invention to provide a measuring device of the type, in which a slider is so provided that it can move back and forth in the same direction of such a relatively movable portion as can move relative to a frame and that it can be fixed on said frame at any position in the forward and backward moving directions thereof, and in which there is interposed between said slider and said relatively movable portion such spring bias means as can apply its spring force to said relatively movable portion in the forward and backward moving directions of the same, whereby the measuring pressure to be applied to a test piece (an object to be measured) by said relatively movable portion can be automatically predetermined at a substantially constant level independently of the position of said relatively movable portion relative to said frame.

Another object of the invention is to provide a measuring device of the type, in which a supporting post is fixed to the frame in parallel with the relatively movable portion and at a spacing from the same and in which a slider is slidably held on said supporting post, whereby said slider is supported on said frame slidably in the same direction as the forward and backward moving directions of said relatively movable portion thereby to facilitate the support of said relatively movable portion on said frame.

Still another object of the present invention is to provide a measuring device of the type, in which said supporting post is constructed of two members, whereby said slider can be easily and reliably prevented from rotating in the circumferential direction of said supporting posts.

A further object of the present invention is to provide a measuring device of the type, in which the fixing means for fixing said slider upon the frame is constructed to include: a rack provided at the side of said frame in the same direction as the forward and backward moving directions of said slider; a pawl held on said slider such that it can move back and forth relative to said rack; and a spring or the like interposed between said pawl and said slider for biasing said pawl toward and into engagement with said rack, whereby said slider can be easily and reliably fixed on said frame at any position in the moving direction thereof.

A further object of the present invention is to provide a measuring device of the type, in which either said relatively movable portion or said slider is equipped with a pair of movement regulating portions spaced from each other in the forward and backward moving directions thereof, in which the other of said relatively movable portion and said slider is equipped with a retaining portion interposed between said paired movement regulating portions, in which the spacing between said paired movement regulating portions is so predetermined that said retaining portion can move slightly between said paired movement regulating portions in the forward and backward moving direction of said relatively movable portion, and in which a spring acting as said spring bias means is interposed between at least one of said movement regulating portions and said retaining portion, whereby said relatively movable portion and said slider can be connected without any play.

A further object of the present invention is to provide a measuring device of the type, in which the rack acting as the fixing means is provided on said supporting post so that it can be easily worked.

A further object of the present invention is to provide a measuring device of the type, in which the spring acting as said spring bias means is loosely fitted on said supporting post thereby to ensure the retention thereof.

A further object of the present invention is to provide a measuring device of the type, in which the rack acting as the fixing means is provided on one of the two supporting posts whereas the spring acting as said spring bias means is loosely fitted on the other of said two supporting posts, whereby the mounting capability and workability of the parts can be improved.

A further object of the present invention is to provide a measuring device of the type, in which said lift knob is made integral with the pawl acting as said fixing means, whereby the operations of said slider and said pawl can be simultaneously performed.

DESCRIPTION OF THE PREFERRED EMBODIMENT

Figure 1:
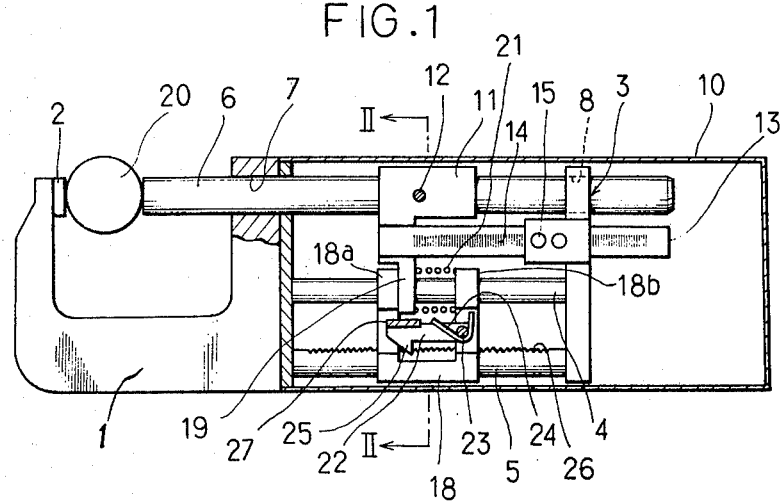
FIG. 1 is a partially sectional view showing a measuring device according to one embodiment of the present invention.

One embodiment, in which the present invention is applied to a micrometer, will now be described with reference to the accompanying drawing. Indicated at reference numeral 1 is a first frame generally having a shape of letter "U", which is disposed at the side of a measuring portion and which has its leading end attached with an anvil portion 2 at its inside and its trailing end jointed to a second frame 3 acting as a fixing portion. The second frame 3 is supported on the trailing ends of the first frame 1 by means of two supporting posts 4 and 5. These supporting posts 4 and 5 are fixed to the frame 1 in parallel with and at a spacing from each other. Thus, an integral supporting frame is constituted by these frames 1,3 and the two supporting posts 4,5.

Indicated at reference numeral 6 is a spindle acting as a relatively movable portion or first adjustable element, which is supported slidably back and forth relative to the anvil 2 by means of holes 7 and 8 such that it can be moved by the operation of a later-described lift knob 9 from the position, where its leading end (or the lefthand end, as shown) abits against the anvil 2, through the position in the drawing to the righthand position. Since the frame 3 is covered with a case 10, the lift knob 9 protrudes to the outside thereof. Incidentally, the aforementioned supporting posts 4 and 5 are arranged in parallel with and at a spacing from the spindle 6.

A block member 11 is integrally attached to the spindle 6 by means of a screw 12. To this block member 11, there is fixed the front end side of a glass scale 13 which is disposed not to contact with the frame 3. This glass scale 13 is formed on its transparent glass body with graduations in $\mu$ (which are not actually seen unless they are enlarged but which are shown in an enlarged scale for understanding convenience). To the frame 3 integrally interconnecting the supporting posts 4 and 5, there are arranged both a not-shown light emitting element and a photoelectric converting element 15 at positions across the glass scale 13 such that the light emitted from the light emitting element may pass through the glass scale 13 until it reaches the photoelectric converting element 15. As a result, the brightness of the light to reach the photoelectric converting element 15 is changed in accordance with the movement of the spindle 6. The resultant change in the brightness is converted by the element 15 into electric signals, which are counted by a counting circuit so that their values are displayed in a liquid crystal display plate 16 which is mounted on the surface of the case 10. In this case 10, there is arranged a print substrate 17 such that the aforementioned electric processing is performed.

The supporting posts 4 and 5 constitute a portion of the second frame 3 and are arranged in parallel with the spindle 6. A slider 18, which forms a second adjustable element is so held on those supporting posts 4 and 5 that it can move in the same direction as the forward and backward moving directions of the spindle 6. The slider 18 thus mounted is formed into a U-shape, as shown, and is formed with movement regulating portions 18a and 18b which are spaced from each other in the forward and backward moving directions of the spindle 6. Into the opening between those movement regulating portions 18a and 18b, an arm (or depending retaining portion) 19 is inserted, which forms a part of the block member 11. Between the opening of the slider 18 and the arm 19, moreover, there is interposed under compression a spring 21 acting as spring bias means for biasing the spindle 6 into contact with a test piece (an object to be measured) or workpiece 20. The test piece or workpiece 20 has a linear dimension to be measured between two opposed sides thereof.

As a result, the force of the spring 21 is applied to the spindle 6 through the block member 11 and the arm 19 constituting a part of the former so that the spindle 6 is biased to move in the leftward direction, as shown, relative to the slider 18. Incidentally, this movement has its limit at the position, where the arm 19 contact with the inside of the lefthand porton (i.e., movement regulating portion 18a) of the opening of the slider 18, as shown.

A pawled arm 22 acting as a portion of the fixing means has its base portion pivotally connected to the slider 18 by means of a pivot pin 23. The rotating force in the counter-clockwise direction, as viewed in FIG. 1, is effected by a spring 24 (forming a part of the fixing means) which is wound on the pivot pin 23. This spring 24 has its one end retained at a portion of the slider 18 and its other end retained on the pawled arm 22 (forming a part of the fixing means).

Figure 2:
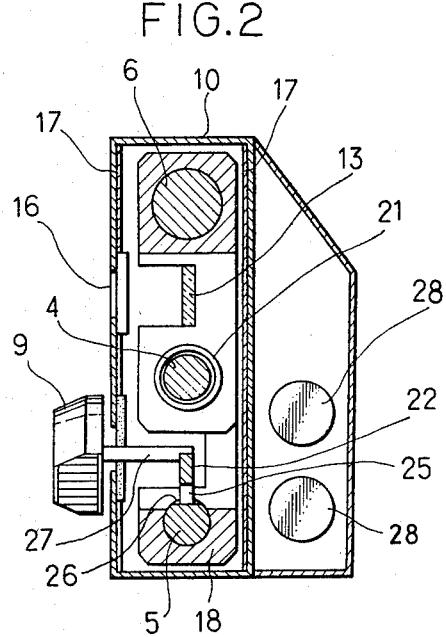
FIG. 2 is a sectional view taken along line II—II of FIG. 1.

The pawled arm 22 has its leading end portion formed with a pawl 25, which can engage with a rack 26 (as shown in FIG. 2) formed in the same direction as the forward and backward moving directions of the spindle 6. The pawl and rack form a ratcheting mechanism. The shape of the teeth of the rack 26 need not have a triangular section, as shown, but may be rectangular. Here, the spacing between the teeth should be made as small as possible.

The portion of the leading end of the pawled arm 22, which is located at the back of the pawl 25, is raised to form an upright portion 27, to the leading end of which the lift knob 9 is attached. As a result, the pawled arm 22 can be made to bring its pawl 25 into and out of engagement with the rack 26 by moving the lift knob 9 up and down in FIG. 1. As shown in FIG. 2, incidentally, the case 10 has its portion extending backward so that a battery 28 acting as a power source is accommodated in the extension.

The micrometer having the construction thus far described is used in the following manner. First of all, before the measuring condition shown in FIG. 1 is taken, the lift knob 9 is pushed to position the spindle 6 at its right position. When the pawled arm 22 is slightly turned clockwise on the pivot pin 23 by pushing the lift knob 9 upward in FIG. 1 from the aforementioned condition, the pawl 25 is disengaged from the rack 26.

When, under this condition, the lift knob 9 is pushed leftward in FIG. 1, the slider 18 is also moved leftward. Since, at this instant, the spring 21 pushes the arm 19, the spindle 6 is moved leftward through the block member 11. At this time, the glass scale 13 is also moved so as to operate the circuit, which is assembled in the print substrate 17, together with the photoelectric converting element 15. As a result, value of the movement is detected and displayed in the liquid crystal display plate 16.

When the spindle 6 is moved leftward in that way until it holds the test piece 20 together with the anvil 2, as shown in FIG. 2, it receives a reaction so that it does not move any more in the leftward direction. Even if it is tried to advance the slider 18 by means of the lift knob 9 under that condition, then the spring 21 is warped to prevent further advance so that the force of the spring is exerted as the measuring pressure at a constant level upon the spindle 6. When the finger of the measurer is released from the lift knob 9, that particular condition will continue.

Although the embodiment thus far described is the case, in which the present invention is applied to the micrometer, the present invention can also be applied to the measuring device other than the micrometer, such as the slide calipers, the depth gauge or the height gauge. In this case, it is sufficient to provide another relatively movable portion at the back portion of the auxiliary scale which is intrinsically the relatively movable portion, to provide retaining means having a pawl and a rack at the relatively movable portion added, and to interpose a spring between the additional movable portion and the auxiliary scale.

As has been described hereinbefore, according to the present invention, since a slider is so provided that it can move back and forth in the same direction of such a relatively movable portion as can move relative to a frame and that it can be fixed on said frame at any position in the forward and backward moving directions thereof, and since there is interposed between said slider and said relatively movable portion such spring bias means as can apply its spring force to said relatively movable portion in the forward and backward moving directions of the same, the measuring pressure to be applied to a test piece (an object to be measured) by said relatively movable portion can be automatically predetermined at a substantially constant level independently of the position of said relatively movable portion relative to said frame. Moreover, in case this construction is used in the micrometer as in the aforementioned embodiment, after the test piece is held between the anvil and the spindle, the force for pushing the lift knob is isolated from the spindle thereby to invite an advantage that there is no measuring error established, as is different from the prior art. Still moreover, since the construction itself is simple, the present invention can be applied not only to the micrometer, as exemplified, but also to the measuring device such as the slide calipers or the height gauge without any difficulty. In either application, there can be attained advantages that the size of the device can be reduced and that the usability at an equal level to the prior art can be ensured.

According to the present invention, furthermore, since a supporting post is fixed to the frame in parallel with the relatively movable portion and at a spacing from the same, and since a slider is slidably held on said supporting post, said slider is supported on said frame slidably in the same direction as the forward and backward moving directions of said relatively movable portion thereby to facilitate the support of said relatively movable portion on said frame.

Since said supporting post is constructed of two members, said slider can be easily and reliably prevented from rotating in the circumferential direction of said supporting posts.

Since the fixing means for fixing said slider upon the frame is constructed to include: a rack provided at the side of said frame in the same direction as the forward and backward moving directions of said slider; a pawl held on said slider such that it can move back and forth relative to said rack; and a spring on the like interposed between said pawl and said slider for biasing said pawl toward and into engagement with said rack, said slider can be easily and reliably fixed on said frame at any position in the moving direction thereof.

Since either said relatively movable portion or said slider is equipped with a pair of movement regulating portions spaced from each other in the forward and backward moving directions thereof, since the other of said relatively movable portion and said slider is equipped with a retaining portion interposed between said paired movement regulating portions, since the spacing between said paired movement regulating portions is so predetermined that said retaining portion can move slightly between said paired movement regulating portions in the forward and backward moving directions of said relatively movable portion, and since a spring acting as said spring bias means is interposed between at least one of said movement regulating portions and said retaining portion, said relatively movable portion and said slider can be connected without any play.

Since the rack acting as the fixing means is provided on said supporting post, it can be easily worked.

Since the spring acting as said spring bias means is lossely fitted on said supporting post, its retention can be ensured.

Since the rack acting as the fixing means is provided on one of the two supporting posts whereas the spring acting as said spring bias means is loosely fitted on the other of said two supporting posts, the mounting capability and workability of the parts can be improved.

Since said lift knob is made integral with the pawl acting as said fixing means, the operations of said slider and said pawl can be simultaneously performed.

What is claimed is:

1. A measuring device for measuring a lilnear dimension of a workpiece wherein the linear dimension is measured between two opposed sides of the workpiece, the measuring device comprising:

a frame having an anvil portion and supporting portion wherein the workpiece is positioned with one side against the anvil portion and the other side adjacent to the supporting portion;

a first adjustable element having a surface thereon for engaging the other side of the workpiece;

means for reciprocally mounting the adjustable element on the supporting portion of the frame with the workpiece engaging surface positioned opposite the anvil portion of the frame whereby the workpiece is disposed between the anvil portion and workpiece engaging surface during utilization of the measuring device;

a second adjustable element reciprocally mounted on the frame for motion paralleling that of the first adjustable element, the second adjustable element having a pair of opposed surfaces defining a space therebetween;

a depending portion on the first adjustable element positioned between the opposed surfaces;

spring means disposed between the depending portion and one of the opposed surfaces for biasing the first adjustable element toward the anvil;

ratchet means disposed between the second adjustable element and the frame for preventing movement of the second adjustable element in a direction away from the anvil portion while permitting movement in a direction toward the anvil portion while the ratchet means is engaged;

means for normally holding the ratchet means engaged;

handle means for releasing the ratchet means and for reciprocating the second adjustable element with respect to the anvil, and means on the frame for indicating the distance between the anvil portion and workpiece engaging surface of the first adjustable element to thereby display the linear dimension of the workpiece when the workpiece is disposed between the anvil portion and workpiece engaging surface;

whereby, when the workpiece is disposed between the anvil portion of the frame and the workpiece engaging surface of the first adjustable element, the spring means exerts the force necessary to keep the workpiece engaging surface in abutment with the side of the workpiece and thus isolates the holding force from that provided by the measurer.

2. The measuring device of claim 1 wherein the spring means is a coil spring in compression between the depending portion of the first adjustable element and the opposed surface of the second adjustable element which faces toward the anvil portion of the frame.

3. The measuring device of claim 2 wherein the first and second elements are mounted on surfaces of the frame which extend perpendicular to the anvil portion whereby the first and second elements reciprocate normally and in a straight line with respect to the anvil portion.

4. The measuring device of claim 1 wherein the first and second elements are mounted on surfaces of the frame which extend perpendicular to the anvil portion whereby the first and second elements reciprocate normally and in a straight line with respect to the anvil portion.

5. The measuring device of claim 2 wherein the ratchet means includes a pawl mounted on the second adjustable element and the means for releasing the ratchet means includes a handle attached to the pawl, which handle is also utilized to position the second adjustable element and thus the first adjustable element with respect to the anvil portion of the frame.

* * * * *